Patented Nov. 14, 1944

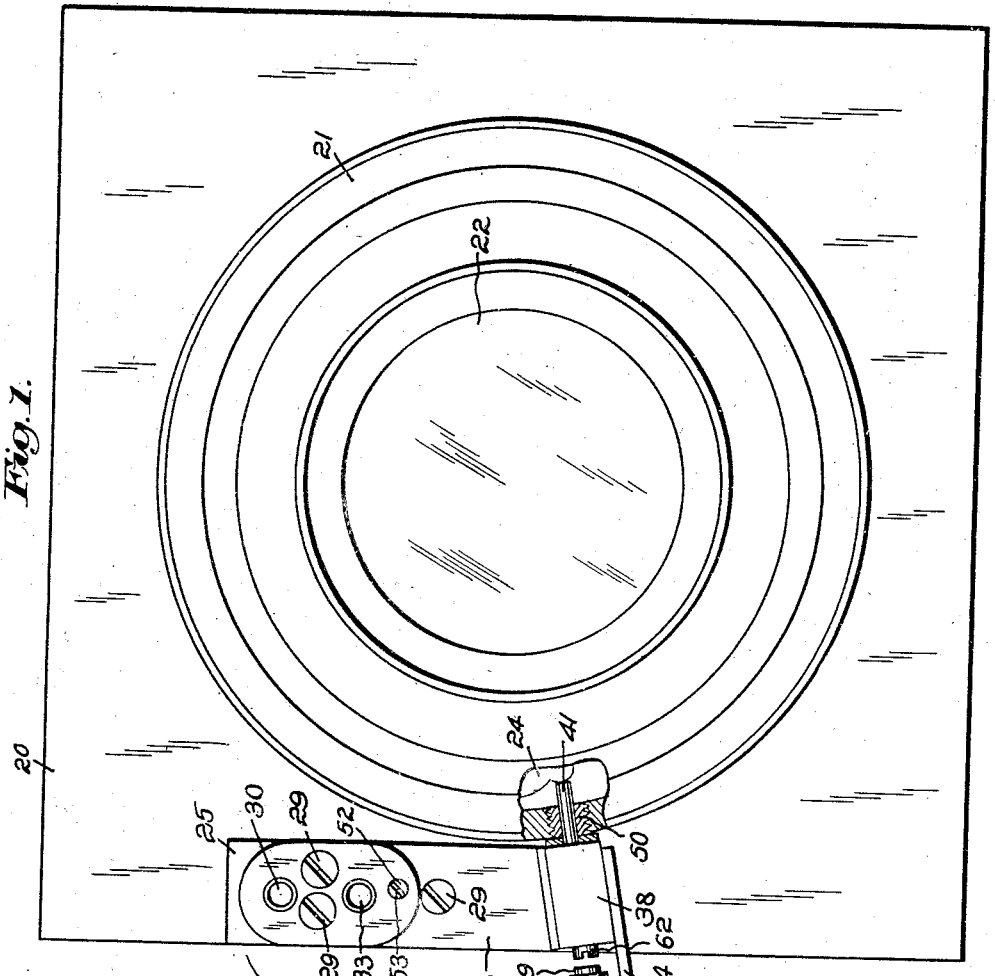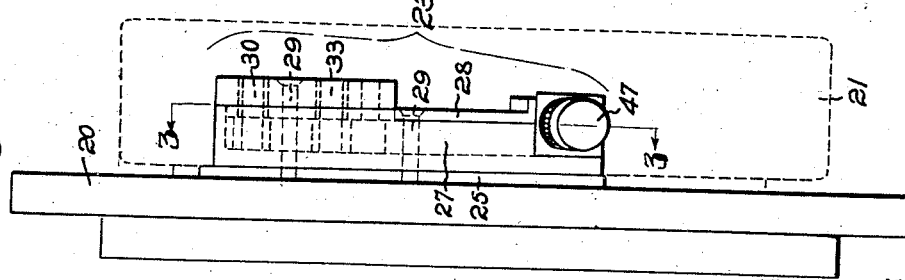

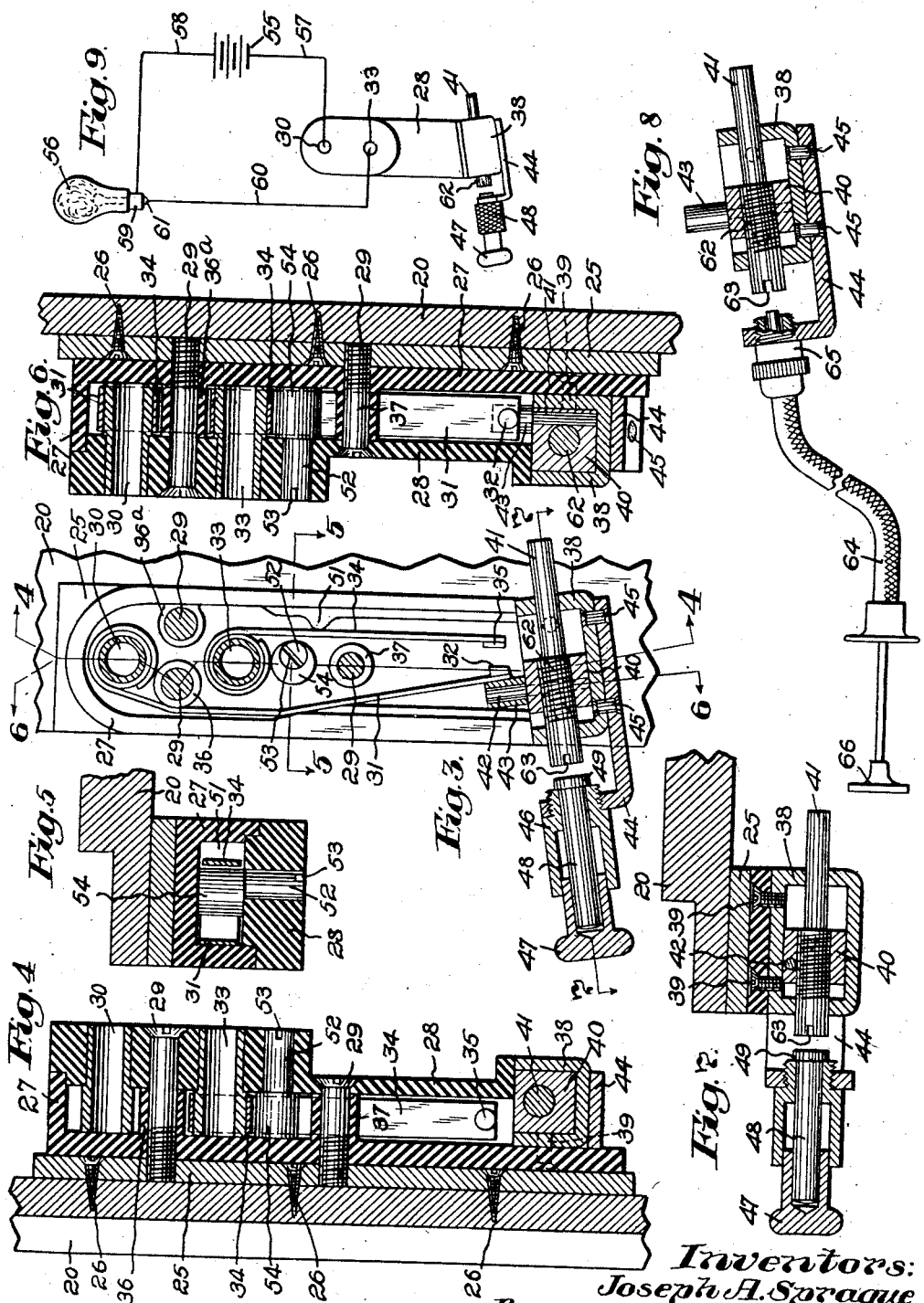

2,362,863

UNITED STATES PATENT OFFICE 2,362,863

PHOTOFLASH SYNCHRONIZING DEVICE

Joseph A. Sprague, Honeoye Falls, and Benjamin D. Chamberlin, Rochester, N. Y., assignors to The Folmer Graflex Corporation, Rochester, N. Y., a corporation of Delaware Application November 18, 1942, Serial No. 465,954

2 Claims. (Cl. 67—29)

This invention relates to a new and improved photoflash synchronizing attachment for between-the-lens shutters of photographic cameras.

In order that the principle of the invention may be readily understood, we have disclosed a single embodiment thereof in the accompanying drawings, wherein—

Fig. 1 is a front elevation of a photographic camera lens board having a shutter and our synchronizing attachment or device mounted thereon;

Fig. 2 is a left hand end elevation of Fig. 1;

Fig. 3 is a top plan view partially in transverse section of the synchronizing attachment with the cover removed;

Fig. 4 is a vertical section through Fig. 3 on the line 4—4 thereof;

Fig. 5 is a vertical section through Fig. 3 on the line 5—5 thereof, showing the construction of the time-adjusting device;

Fig. 6 is a vertical section similar to Fig. 4, but on the line 6—6 of Fig. 3;

Fig. 7 is a vertical section through Fig. 3 on the line 7—7 thereof showing the construction of the operating member;

Fig. 8 is a fragmentary view similar to Fig. 3 and showing also the attachment of the cable release; and Fig. 9 is a schematic view of the synchronizer attachment including the battery, the flash lamp and the wiring for completing the circuit to said flash lamp.

There has been definite need for a simple, small and compact synchronizing device for between-the-lens shutters of photographic cameras that can be attached directly to the camera lens board carrying the shutter, and it is most desirable that such a device be so constructed as not in any way to interfere with the normal operation of the shutter or of the closing of the camera when such a device is attached. Our invention fulfills this need. One of the objects of such invention herein disclosed is to provide a synchronizing device that can be attached to a camera lens board carrying a between-the-lens shutter, without in any way making structural changes in the shutter. Other objects of the invention are: to provide a synchronizer that can be operated either by push button or by cable release; to provide a synchronizer mechanism that is always in position ready for use, so that the shutter is operated through it without regard to whether a flash exposure is being made or not, and still another object of the invention is to provide very simple adjusting means for varying the time of contact to the photoflash lamp when the shutter is being operated.

Referring more particularly to the drawings, wherein a single embodiment of the invention is represented by way of example, we have shown therein a lens board 20 of the conventional type such as used in the Speed Graphic camera, and attached thereto are shown a shutter 21 and lens 22, the synchronizing device or attachment constituting this invention being indicated generally at 23. The shutter 21 is shown with a broken-away portion in the cover thereof so as more clearly to present the shutter release lever 24 which will be more fully referred to subsequently.

Referring now particularly to Figs. 3 to 7, a synchronizer base member is indicated at 25, it being attached to the lens board 20 of the camera by means of wood screws 26, 26, shown in Figs. 4 and 6. The lower casting or member of the synchronizer housing is represented at 27 and the upper casting or member thereof at 28, said two castings or members composing the housing being held together and to the said base member 25 by means of screws 29, 29. Fitted into the said top casting or member of the said housing is a tubular member 30, shown in longitudinal section in Figs. 4 and 6, which serves as one of the contact plug members of the synchronizing device or attachment comprising the invention. Attached to the said tubular member 30, as best shown in Fig. 3, is a contact member 31 consisting of a relatively long spring arm and having at its lower end a contact point 32. Also fitted to the said top casting or member of the housing is a second tubular member 33, also shown in longitudinal section in Figs. 4 and 6, having a contact member shown as a relatively long spring arm 34 which at its lower end is provided with a contact point 35. The said tubular member 33 also serves as the second contact plug member.

As shown in Fig. 3, the screw 29 at the left is provided with an insulating bushing 36 so as to insulate the said spring arm 31 from the said screw 29. Such bushing 36 is preferably integral with the lower casting or member 27 of the synchronizer housing. The lowermost screw 29, shown in Fig. 3, is also provided with an insulating bushing or boss 37 which prevents the possibility of a short circuit occurring between the spring arm 34 and the said lower screw 29.

To the lower end of the lower casting or member 27 of the synchronizer housing viewing Figs. 3, 4 and 6 is attached, as indicated generally at 38 by screws 39, a metallic box-like member or structure, and free to slide therein is a slide member 40, into which is threaded an operating rod or pin 41 herein broadly termed a rod-like member, said member 40 also carrying a contact operating pin 42 about which is received an insulating bushing 43. The said slide member 40 and the rod or pin 41 are free to move in the confines of the said box-like member 38, and as the said slide member 40 is moved in a right hand direction, viewing Fig. 3, the spring contact arm 31 will be caused to move in a right hand direction until the said slide member 40 reaches the limit of its travel in said box-like member 38. Prior to the limit of such travel the contact points 32 and 35 will have touched to complete an electrical circuit, depending upon the adjustment of the contact spring arm 34, as will be hereinafter more fully described.

A preferably L-shaped member 44 is attached by means of rivets 45, 45 to the said box-like member 38 and threaded into the shorter leg or part of said member 44 is a sleeve or bushing 46 fitted into which, so as to be free to slide therein, is a push button or knob 47 that is attached to an operating rod 48 received in the said sleeve or bushing 46 and prevented from dropping out of the same by an enlarged collar 49. The said operating rod 48 is securely attached to the push button or knob 47 by a press fit or in any other suitable manner.

As the push button or knob 47 is operated, the enlarged collar 49 will contact with the movable rod or pin 41 carrying with it the slide member 40, the pin 42, bushing 43, contact spring arm 31 and contact point 32. The rod or pin 41 will extend through a suitable guide bushing 50, shown in Fig. 1 as threaded into the wall of the shutter structure 21. The operating rod or pin 41 will engage, as shown in Fig. 1, the shutter release lever 24, thus causing the shutter 21 to be operated. As the operating rod or pin 41 moves in a right hand direction, viewing Figs. 1 and 3, to operate the shutter, the contact spring arm 31 will also be moved in a right hand direction. The shutter 21 will be operated and electrical contact will be completed between the contact points 32 and 35. Such electrical contact should take place for the proper synchronization of the flash bulb at the exact time the shutter blades or leaves start to open. In order to provide very convenient and accurate means for adjusting the time at which contact points 32 and 35 make electrical contact, we have provided means now to be described.

Preferably cast integral with the inner right hand wall of the lower casting or member 27 of the synchronizer housing is a triangular shaped boss 51, best shown in Fig. 3, and fitted into the upper casting or member 28 of the housing is a screw shaft 52, shown in Figs. 4, 5 and 6 as having a screw-driver slot 53. Attached to the lower or inner end of said screw shaft 52 is an eccentric member 54. By turning the screw shaft 52 by means of a screw-driver fitted into the slot 53, the eccentric member 54 will also be caused to turn and to contact with the contact spring arm 34, as is evident from Fig. 3. Inasmuch as said contact spring arm 34 cannot be moved beyond the triangularly shaped boss 51, the contact spring arm 34 will be caused to be flexed outwardly between the boss 51 and the sleeve 33, thus causing the lower end of the spring contact arm 34 to swing or move inwardly—that is, in a left hand direction viewing Fig. 3, thus bringing the contact points 32 and 35 closer together and thereby causing electrical contact to be made by contact points 32 and 35 at an earlier time with respect to the stroke of the rod or pin 41, as the shutter 21 is being operated by the application of pressure to the operating push button or knob 47. The boss 51 may be located higher than shown in Fig. 3 to cause arm 34 to swing outwardly when the member 54 is turned, namely, just below the axis of the sleeve 33.

We provide a battery 55 and a flash lamp 56, and in the circuit wiring including said battery and flash lamp is shown (in the diagram Fig. 9) wherein the tubular member 30 has attached thereto a wire 57 that leads to one side of the battery 55. A second wire 58 leads from the other side of the battery 55 to the base 59 of the flash lamp 56, and a third wire 60 extends from the contact 61 of the flash lamp 56 to the second tubular member 33 of the synchronizer.

The herein disclosed synchronizer has been constructed so as to flash lamps of the short time interval (that is, flash lamps such as the General Electric SM lamps having a lag of five milliseconds from the time of contact to peak illumination of the flash lamp. It is a well known fact that all shutters now generally available have a similar lag (that is, five milliseconds from the time the shutter is released until the blades or leaves of the shutter reach the full open condition). Therefore, the ideal or perfect adjustment will be to have contact points 32 and 35 engage to complete the electrical circuit at the exact instant the said shutter blades or leaves are released to be opened. To that end, we have provided the following construction.

The rod or pin 41 of the synchronizer is provided with a threaded portion 62 (best shown in Fig. 3) which is fitted in a suitable threaded opening in the slide member 40. In order to adjust the synchronizer, the slide member 40 and the rod or pin 41 are moved forward by means of a screw driver engaging a screw driver slot 63, after the sleeve or bushing 46 has been unscrewed and removed to permit access to said slot 63. The said rod or pin 41 is thus moved forward until it is stopped against the right hand end of the box-like metallic member 38. If the shutter 21 is tripped through this action, the said rod or pin 41 is turned in a contraclockwise direction, thus shortening its effective length. The said rod or pin 41 is again pushed forward until the slide member 40 is stopped against the box-like member or structure 38 and the shutter 21 will not be released. The said rod or pin 41 is held in a forward position and is turned by means of a screw driver while being held in this position until the shutter is released. While still held in this position, the adjusting screw shaft 52 is turned until the contact points 32 and 35 just touch or make electrical contact so as to complete the circuit, which fact can be checked by putting a miniature lamp temporarily in the circuit in place of the flash lamp or bulb 56. It has been found best in actual practice to have the contact points 32 and 35 actually touch or make electrical contact just before the slide member 40 reaches the limit of its travel, thus assuring electrical contact when the shutter is operated.

The sleeve or bushing 46 is now replaced and a flash bulb 56 is installed in the socket in place of the miniature lamp referred to, so that the synchronizer is now ready for the making of an exposure by the mere act of applying pressure to the push button or knob 47 after the shutter has been set.

The described mechanism will not cause the flash lamp 56 to be flashed when the shutter is reset inasmuch as the shutter release lever 24 (shown in Fig. 1) is caused to be moved in an outward direction viewing Fig. 1, during the described operation, as the rod or pin 41 will be pushed in an outward direction by the said shutter release lever 24 and away from the contact spring arm 31. Therefore, the only time that a flash will occur is when a flash bulb is in place in the circuit and pressure is applied to the operating push button or knob 47.

If it is desired not to employ a flash bulb, such as 56, it may readily be removed from its position in the circuit, or the plugs of the wires 57, 60 may be pulled out from the tubular members 30, 33, and the shutter may be operated as described and the exposure made without a flash.

It is sometimes desirable to use a cable release, such as indicated at 64 in Fig. 8. In order to accommodate such a cable release the sleeve or bushing 46 is unscrewed from the L shaped member 44 and the attaching ferrule 65 of the cable release 64 is threaded into said L shaped member 44, the two operating means (namely, the push button and cable release) having been made for use interchangeably as described. When the cable release is installed, pressure on the cable release button 66 will cause the shutter to be operated and the flash bulb 56 to be ignited in synchronism as described.

We have herein disclosed a very simple structure for synchronizing flash lamps with between-the-lens shutters of photographic cameras that is very inexpensive to manufacture and very simple to install and adjust, but which is nevertheless exceedingly accurate. We have not herein disclosed a battery case, but it is to be understood that any type of battery case having a series outlet may be used, and since no electrical current is used for operating any magnetic device, a battery case having only two cells of the flashlamp type is necessary. This is of considerable advantage because it permits the use of a very much smaller and much more compact battery case.

While the invention has been described with respect to a lens board such as used in a Speed Graphic camera, it is evident that our invention is an attachment or device that may be applied to many different types of photographic cameras.

While the invention is disclosed as applied to and as peculiarly applicable to between-the-lens shutters, it is not necessarily restricted to use with such type of shutters.

Having thus described one illustrative embodiment of the invention, it is to be understood that although specific terms are employed, they are used in a generic and descriptive sense and not for purposes of limitation, the scope of the invention being set forth in the following claims.

We claim:

1. A switch structure for operating a photographic shutter-release member, comprising a housing shaped so as to be attachable flatwise, lengthwise to the face of the lens board of a camera closely adjacent the shutter thereof in operable proximity to the shutter release member; said housing comprising a plate-like base member 25 attachable flatwise to the face of such lens board, and a lower box-like member 27 positionable flatwise against said base member and also an upper cover-like member 28 receivable upon said lower member 27; screw-like means 29 for securing said upper and lower members 27, 28 in position upon said base member 25; said members 27, 28 having tubular contact plug members 30, 33 positioned transversely therein to receive electrical wiring plugs; an elongated spring-arm contact member 31 of an electric circuit mounted in said housing upon said contact plug member 30 and extending lengthwise of and within the lower member 27 of the housing; a second co-acting, elongated, spring-arm contact member 34 mounted in said housing upon said contact plug member 33 and extending lengthwise of and within said housing member 27 in general parallelism with said member 31, said spring-arm contact members 31, 34 having contact points 32, 35 at their free end portions in proximity to each other; the said housing at the end thereof nearest the terminal points of said spring-arm contact members having a box-like portion 38; a slide member 40 mounted in said box-like portion 38 for sliding movement therein transverse to the lengthwise extent of said housing members 27, 28 and having a laterally-extending contact-operating pin-like member 42 to engage said spring-arm contact member 31, thereby to move the same into engagement with said spring-arm contact member 34; a shutter release member operating rod 41 threaded for lengthwise adjustment in and extending lengthwise through said slide member 40 into proximity to the shutter release member of the shutter; means for imparting lengthwise operating movement to said operating rod 41 and to the slide member 40 wherein the said rod 41 is mounted, thereby to close the contacts of said spring-arm contact members 31, 34; and means for adjusting the time at which said spring-arm contact members 31, 34 make electrical contact, such means including a stop formation in the housing member 27 engaging the outer face of the spring-arm contact member 34 between the ends thereof, a rotatably adjustable eccentric part 54 mounted in said housing member 27 in position to contact with the opposite face of the said spring-like contact member 34 so as to flex the same against said stop formation, and thereby to vary the time at which said contact members 31, 34 make electrical contact.

2. A switch structure for operating a photographic shutter-release member, comprising a housing shaped so as to be attachable flatwise, lengthwise to the face of the lens board of a camera closely adjacent the shutter thereof in operable proximity to the shutter-release member; said housing comprising a plate-like base member 25 attachable flatwise to the face of such lens board, and a lower box-like member 27 positionable flatwise against said base member and also an upper cover-like member 28 receivable upon said lower member 27; screw-like means 29 for securing said upper and lower members 27, 28 in position upon said base member 25; said members 27, 28 having tubular contact plug members 30, 33 positioned transversely therein to receive electrical wiring plugs; an elongated spring-arm contact member 31 of an electric circuit mounted in said housing upon said contact plug member 30 and extending lengthwise of and within the lower member 27 of the housing; a second co-acting, elongated, spring-arm contact member 34 mounted in said housing upon said contact plug member 33 and extending lengthwise of and within said housing member 27 in general parallelism with said member 31, said spring-arm contact members 31, 34 having contact points 32, 35 at their free end portions in proximity to each other; the said housing at the end thereof nearest the terminal points of said spring-arm contact members having a box-like portion 38; a slide member 40 mounted in said box-like portion 38 for sliding movement therein transverse to the lengthwise extent of said housing members 27, 28 and having a laterally-extending contact-operating pin-like member 42 to engage said spring-arm contact member 31, thereby to move the same into engagement with said spring-arm contact member 34; a shutter release member operating rod 41 threaded for lengthwise adjustment in and extending lengthwise through said slide member 40 into proximity to the shutter release member of the shutter; means for imparting lengthwise operating movement to said operating rod 41 and to the slide member 40 wherein the said rod 41 is mounted, thereby to close the contacts of said spring-arm contact members 31, 34; and means for adjusting the time at which said spring-arm contact members 31, 34 make electrical contact, such means including a stop formation in the housing member 27 engaging the outer face of the spring-arm contact member 34 between the ends thereof, a rotatably adjustable eccentric part 54 mounted in said housing member 27 in position to contact with the opposite face of the said spring-like contact member 34 so as to flex the same against said stop formation, and thereby to vary the time at which said contact members 31, 34 make electrical contact, the said box-like portion 38 having an L-shaped bracket member 44 connected thereto and extending transversely of the longitudinal axis of the said housing; the said bracket member 44 having in an upwardly extending part thereof a formation to receive therein in axial alignment with the said operating rod 41 alternatively a bushing 46 and operating rod 48, or a cable release 64, 65, 66.

JOSEPH A. SPRAGUE.
BENJAMIN D. CHAMBERLIN.